United States Patent
Yoon (10) Patent No.: US 9,599,822 B2
(45) Date of Patent: Mar. 21, 2017

(54) CORRECTIVE OPTICS FOR REDUCING FIXED PATTERN NOISE IN A VIRTUAL REALITY HEADSET

(71) Applicant: Oculus VR, LLC, Irvine, CA (US)

(72) Inventor: Youngshik Yoon, Cupertino, CA (US)

(73) Assignee: Oculus VR, LLC, Menlo Park, CA (US)

( * ) Notice: Subject to any disclaimer, the term of this patent is extended or adjusted under 35 U.S.C. 154(b) by 278 days.

(21) Appl. No.: 14/479,597

(22) Filed: Sep. 8, 2014

(65) Prior Publication Data

US 2016/0070103 A1    Mar. 10, 2016

(51) Int. Cl.
   *G02B 27/01*    (2006.01)
   *G02B 3/08*     (2006.01)

(52) U.S. Cl.
   CPC ........... *G02B 27/0172* (2013.01); *G02B 3/08* (2013.01); *G02B 27/017* (2013.01); *G02B 2027/011* (2013.01); *G02B 2027/0118* (2013.01)

(58) Field of Classification Search
   None
   See application file for complete search history.

(56) References Cited

U.S. PATENT DOCUMENTS

| | | | |
|---|---|---|---|
| 2008/0165267 A1* | 7/2008 | Cok | H04N 7/144 348/333.01 |
| 2012/0120499 A1* | 5/2012 | Harrison | G02B 17/06 359/631 |

OTHER PUBLICATIONS

Luckey, Palmer, Oculus Rift: Step Into the Game, Details on New display for Developer Kits, Dec. 2012, https://www.kickstarter.com/projects/1523379957/oculus-rift-step-into-the-game/posts/361519, pp. 1-12.*

* cited by examiner

*Primary Examiner* — Said Broome
(74) *Attorney, Agent, or Firm* — Fenwick & West LLP (57) ABSTRACT

A virtual reality (VR) headset includes an electronic display element and a corrective optics block. The electronic display element outputs image light via a plurality of sub-pixels of different colors that are separated from each other by a dark space. The corrective optics block includes an optical element including a diffractive surface. The corrective optics block is configured to magnify the image light and generate optically corrected image light by using the diffractive surface to generate blur spots of each sub-pixel masking dark space between adjacent sub-pixels. Optically corrected light is directed form the corrective optics block to an exit pupil of the VR headset for presentation to a user.

16 Claims, 6 Drawing Sheets

CORRECTIVE OPTICS FOR REDUCING FIXED PATTERN NOISE IN A VIRTUAL REALITY HEADSET

BACKGROUND

The present disclosure generally relates to reducing fixed pattern noise, and specifically relates to reducing fixed pattern noise using at least a diffractive portion of an optical element.

Electronic displays include a plurality of pixels, which may each include a plurality of sub-pixels (e.g., a red sub-pixel, a green sub-pixel, etc.). Arrangement of individual sub-pixels may affect the appearance and performance of an electronic display device. Some arrangements of sub-pixels may increase fixed pattern noise under certain conditions. For example, magnification of a pixel may result in boundaries between individual sub-pixels of the pixel becoming visible to the user, resulting in a "screen door" pattern (i.e., an increase in fixed pattern noise) in an image presented to a user.

SUMMARY

An image presented by an electronic display element within a virtual reality (VR) headset of a VR system is magnified beyond a threshold amount. As a result, a corrective optics block included in the VR headset may cause a user viewing the image through the VR headset to see individual sub-pixels of a pixel in the image, as well as dark space between the sub-pixels (i.e., fixed pattern noise or the "screen door effect"). To reduce this screen door effect, the corrective optics block includes an optical element where at least a portion of the optical element is a diffractive surface configured to blur light from the sub-pixels. The corrective optics block may include one or more optical elements that operate to magnify and correct optical errors, including fixed pattern noise. In some embodiments, the corrective optics block is configured to correct for three-dimensional optical errors (e.g., comatic aberration) using at least one optical element including at least a portion of a diffractive surface, such as a Fresnel surface and/or a binary surface and the VR system uses software correction to compensate for two-dimensional optical errors, such as barrel distortion, etc.

The VR headset includes an electronic display including an electronic display element which outputs image light via a plurality of sub-pixels having different colors, sub-pixels separated from each other by a dark space. In some embodiments, the electronic display includes different electronic display elements for each eye of the user. Alternatively, a single electronic display element is used to display images to both eyes of the user.

Additionally, the VR headset includes a corrective optics block for each eye of the user. A corrective optics block includes an optical element where at least a portion of the optical element is a diffractive surface, such as a Fresnel surface or a binary surface. The diffractive surface may be uniform or may have a higher density of grooves near the center of the optical element. In some embodiments, the optical element is a single optical element including a Fresnel surface positioned to receive image light from the electronic display element and a convex refractive surface that receives diffracted image light from the Fresnel surface. Alternatively, the corrective optics block includes a diffractive optical element and a refractive optical element. The diffractive optical element includes a Fresnel surface positioned to receive the image light from the electronic display element, while the refractive optical element is a convex refractive element positioned between the diffractive optical element and an exit pupil of the VR headset. The exit pupil corresponds to a location of an eye of a user of the VR headset. In other embodiments, the corrective optics block is a single optical element having a hybrid surface including a Fresnel area located in a center portion of the optical element, a refractive area along an outer portion of the optical element, and a binary area located between the Fresnel area and the refractive area, where the binary area includes a plurality of grooves separated by one or more different pitch widths.

The corrective optics block is configured to magnify image light emitted from the electronic display element. Additionally, the corrective optics block is configured to generate optically corrected image light by performing optical error correction on the image light. For example, the optical error correction is performed by the diffractive surface of the optical element generating blur spots masking the dark space between adjacent sub-pixels, where each blur spot corresponds to a blurred image of a corresponding sub-pixel in the image light. The corrective optics block directs the corrected image light to an exit pupil of the VR headset for presentation to the user.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
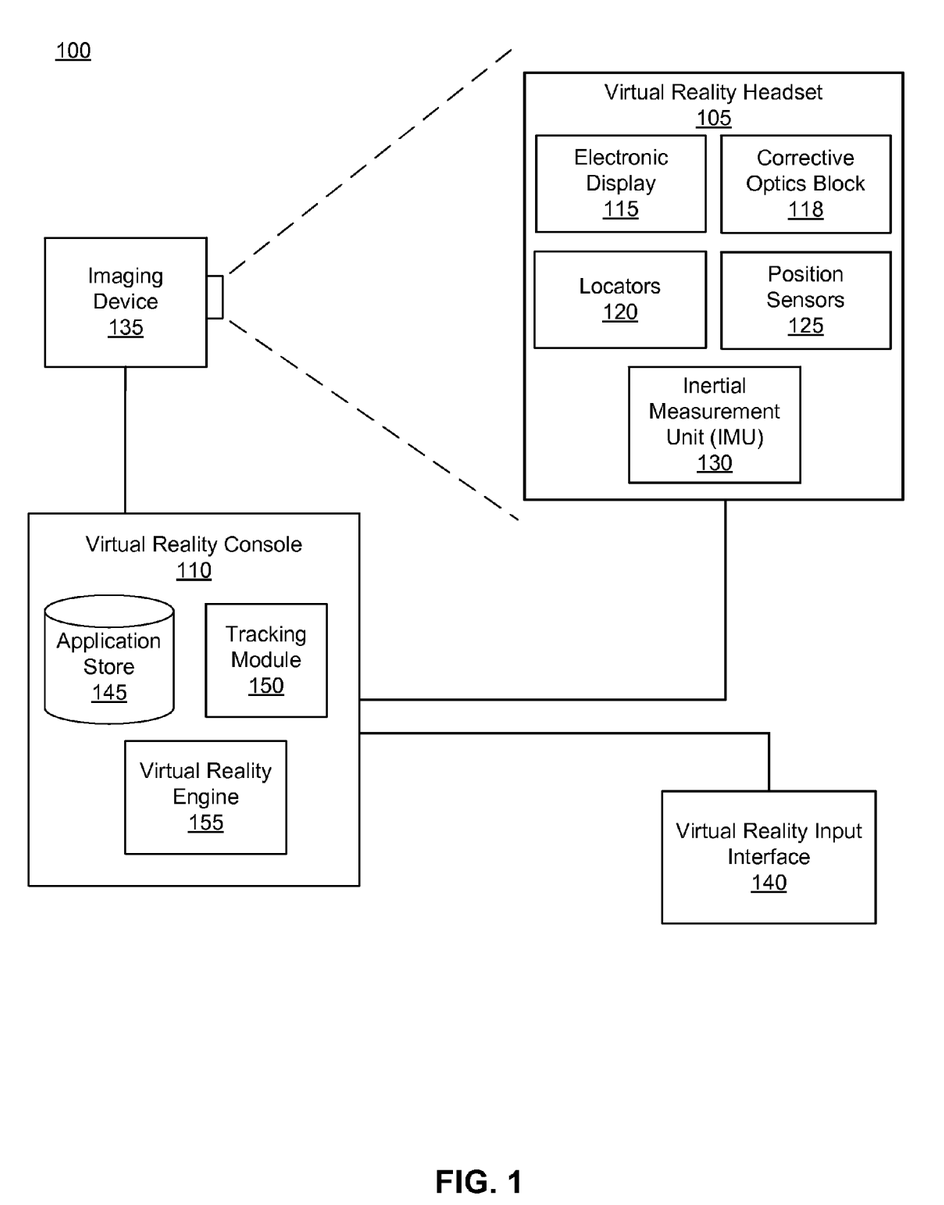
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, a corrective optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The electronic display 115 includes a display area comprising a plurality of sub-pixels, where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level.

The corrective optics block 118 includes one or more optical elements that adjust an image projected by the electronic display 115 to the user by the VR headset 105. In some embodiments, the corrective optics block 118 is positioned at least 35 mm from the electronic display 115. At least a portion of an optical element in the corrective optics block 118 includes a diffractive portion. In various embodiments, an optical element in the corrective optics block includes a refractive surface (e.g., a concave surface), a diffractive surface (e.g., a Fresnel surface, a binary surface, some other type of diffractive element), or some combination thereof. Portions of the diffractive surface and/or the refractive surface may include a flat portion, a curved portion, or both. The diffractive surface of an optical element may be uniform or may have a higher density of grooves near the center of the optical element. A diffractive optical element is an optical element including at least a portion of a diffractive surface. Additionally, in some embodiments, an optical element may be an aperture, a filter, or any other suitable optical element that affects the image projected by the electronic display 115. In some embodiments, one or more of the optical elements in the corrective optics block 118 may have one or more coatings, such as anti-reflective coatings.

The corrective optics block 118 magnifies image light projected by the electronic display 115 and corrects optical errors associated with the image light. Magnification of the image light allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. However, magnification may cause an increase in fixed pattern noise, also referred to as the "screen door effect," which is a visual artifact where dark space separating pixels and/or sub-pixels of a display become visible to a user in an image presented by the display. For example magnification without optical error correction may increase fixed pattern noise to the point where the projected image suffers from the screen door effect. In some embodiments, the corrective optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The corrective optics block 118 may be designed to correct one or more types of optical error. Optical error may be fixed pattern noise (i.e., the screen door effect), two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. As further discussed in conjunction with FIGS. 3A and 3B, the corrective optics block 118 corrects for fixed pattern noise by slightly blurring the image of each sub-pixel so the blurred sub-pixels mask the dark space between the sub-pixels. Specific embodiments of the corrective optics block 118 are further discussed below in conjunction with FIGS. 4-6B. In some embodiments, the media provided to the electronic display 115 for display is pre-distorted, and the corrective optics block 118 corrects the distortion.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ration). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes a media store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates media for presentation to the user. Media generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also account s for information received from the IMU 130. Additionally, if tracking of the VR headset 105 is lost (e.g., the imaging device 135 loses line of sight of at least a threshold number of the locators 120), the tracking module 140 re-calibrates some or all of the system environments 100.

The tracking module 150 tracks movements of the VR headset 105 using slow calibration information from the imaging device 135. As further described below in conjunction with FIG. 3, the tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof, of the VR headset 105 from the tracking module 150. Based on the received information, the VR engine 155 determines media to provide to the VR headset 105 for presentation to the user. For example, if the received information indicates that the user has looked to the left, the VR engine 155 generates media for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
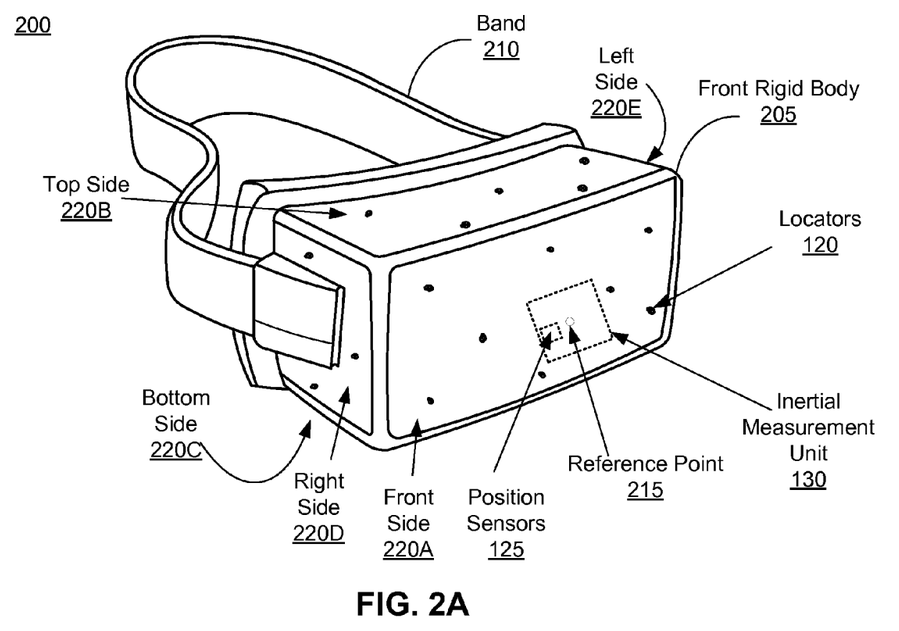
FIG. 2A is a wire diagram of a virtual reality headset, in accordance with an embodiment.

FIG. 2A is a wire diagram of a virtual reality (VR) headset, in accordance with an embodiment. The VR headset 200 is an embodiment of the VR headset 105, and includes a front rigid body 205 and a band 210. The front rigid body 205 includes one or more electronic display elements of the electronic display 115 (not shown), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
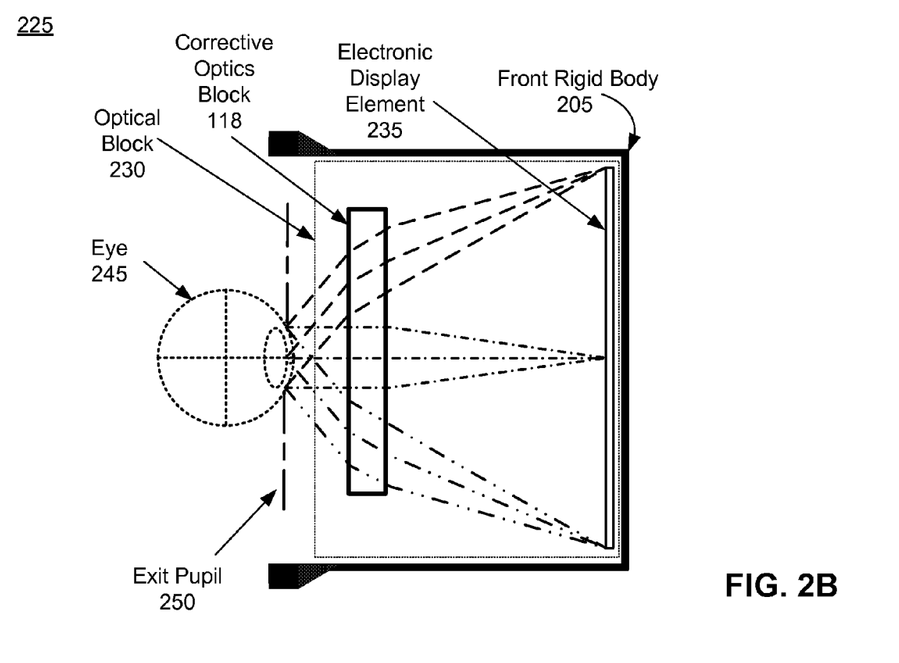
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230, which provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes an electronic display element 235 of the electronic display 115 that projects image light toward the corrective optics block 118, which is included in the optical block 230 and alters the projected image. For example, the corrective optics block 118 magnifies and corrects optical errors associated with the projected image. As further discussed below in conjunction with FIGS. 3A and 3B, the optical block 230 is configured to correct for fixed pattern noise by slightly blurring sub-pixels. The corrective optics block 118 directs the altered image light to the exit pupil 250 for presentation to the user.

Figure 3A:
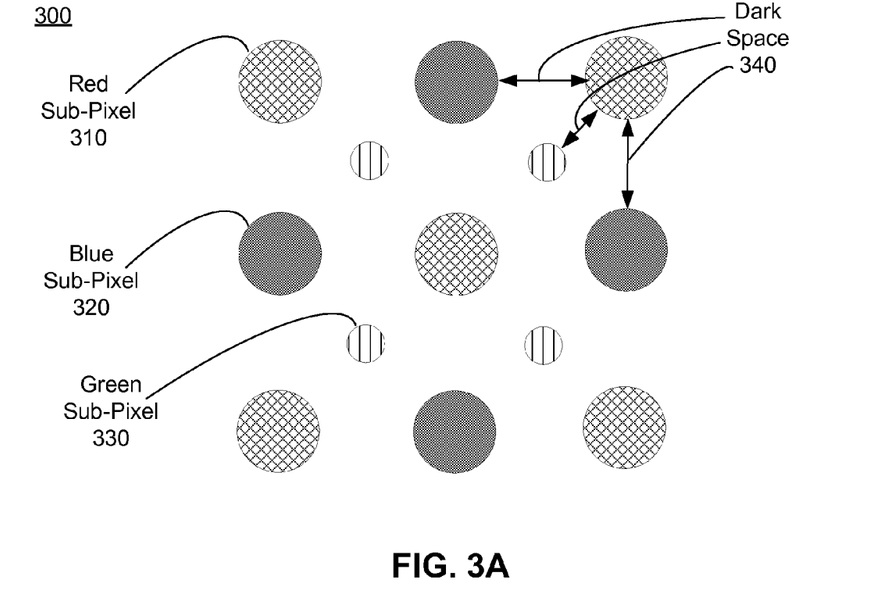
FIG. 3A is an example array of sub-pixels on an electronic display element, in accordance with an embodiment

FIG. 3A is an example array 300 of sub-pixels on the electronic display element 235. The example array 300 shown in FIG. 3A includes red sub-pixels 310, blue sub-pixels 320, and green sub-pixels 330. For example, the array 300 is portion of a PENTILE® display. A dark space 340 separates each sub-pixel from one or more adjacent sub-pixels. The dark space 340 is a portion of the array 300 that does not emit light, and may become visible to a user under certain circumstances (e.g., magnification) causing the screen door effect that degrades image quality. As discussed above in conjunction with FIG. 2B, the optical block 230 includes one or more optical elements configured to reduce fixed pattern noise so the dark space 340 between the sub-pixels is not visible to the user. The corrective optics block 118 within the optical block 230 is configured to blur each sub-pixel, creating a blur spot associated with each sub-pixel in the image. The blur spots are large enough so adjacent blur spots mask the dark space 340 between adjacent sub-pixels.

Figure 3B:
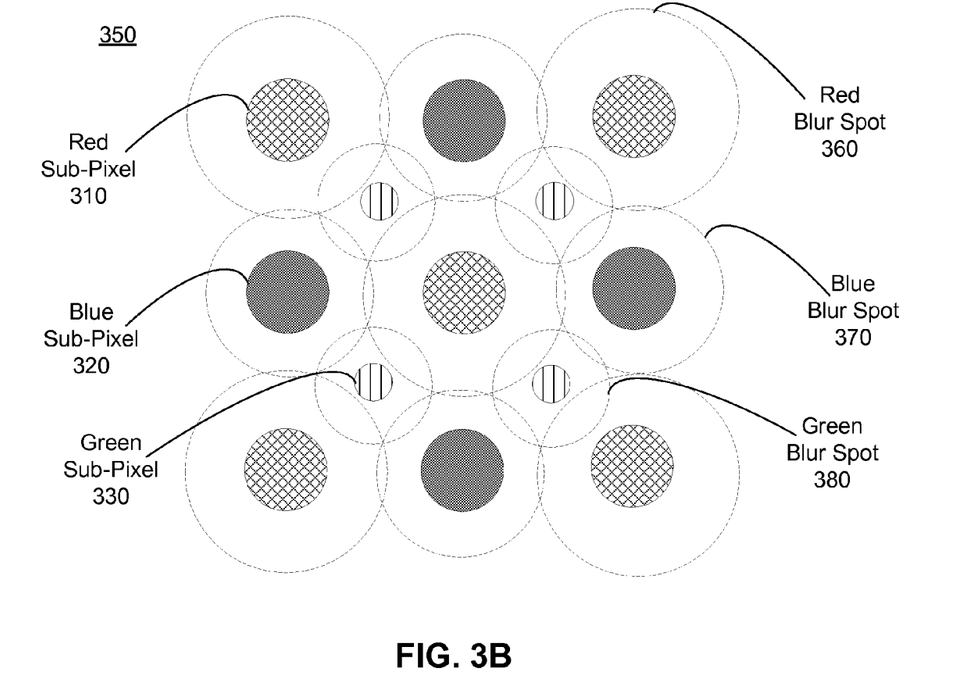
FIG. 3B is an image of an example array of sub-pixels adjusted by a corrective optics block, in accordance with an embodiment.

FIG. 3B is an example illustrating adjustment of image data of the array 300 of FIG. 3A by the corrective optics block 118. As shown in FIG. 3B, each of the sub-pixels has an associated blur spot. Specifically, the red sub-pixels 310 have a corresponding red blur spot 360, the blue sub-pixels 320 have a corresponding blue blur spot 370, and the green sub-pixels 330 have a corresponding green blur spot 380. A blur spot is an area filled with an image of a blurred sub-pixel. So long as a blur spot does not overlap with a point of maximum intensity of an adjacent blur spot, the two blur spots are resolvable as two adjacent sub-pixels. The shape of the blur spot is not necessarily a circle, but is rather an area including the blurred image of a sub-pixel. The corrective optics block 118 is configured to blur each sub-pixel so the blur spots mask the dark space 340 between adjacent sub-pixels.

The diffraction grating equation may be used to calculate the amount an image of a sub-pixel is blurred. For simplicity, the diffraction grating equation for 1 dimension is:

$$n_r \sin(\alpha) - n_i \sin(\beta) = Nm\lambda \quad (1)$$

Where N is the groove density (the pitch is 1/N), m is the order of diffraction (0, ±1, ±2, . . . ), λ is the wavelength of the light emitted from the sub-pixel, α is the angle of the light diffracted by the grating, β is the angle of the light incident on the grating, $n_r$ is the index of refraction on the medium the diffracted light is passing through, and $n_i$, is the index of refraction of the medium the light incident on the grating is passing through. As shown by equation (1), as N increases (i.e., spacing between grooves decreases) the amount of blur increases. Note that it is important to control diffraction to avoid noise caused by diffracted orders of light overlapping more than a threshold amount with images of adjacent sub-pixels of different colors. Moreover, longer wavelengths of light from a sub-pixel generally blur more than the shorter wavelengths, so the red-blur spots 360 are larger than the blue blur spots 370, for example. In some embodiments, because the green sub-pixel 330 has the smallest physical dimension, the corrective optics block 118 is designed so the pitch (1/N) is a multiple of the green wavelength.

As discussed above in conjunction with FIG. 1, the corrective optics block 118 may include one or more optical elements, and examples of the optical block 230 including different configurations of the corrective optics block 118 are further described below in conjunction with FIGS. 4-6B.

Figure 4:
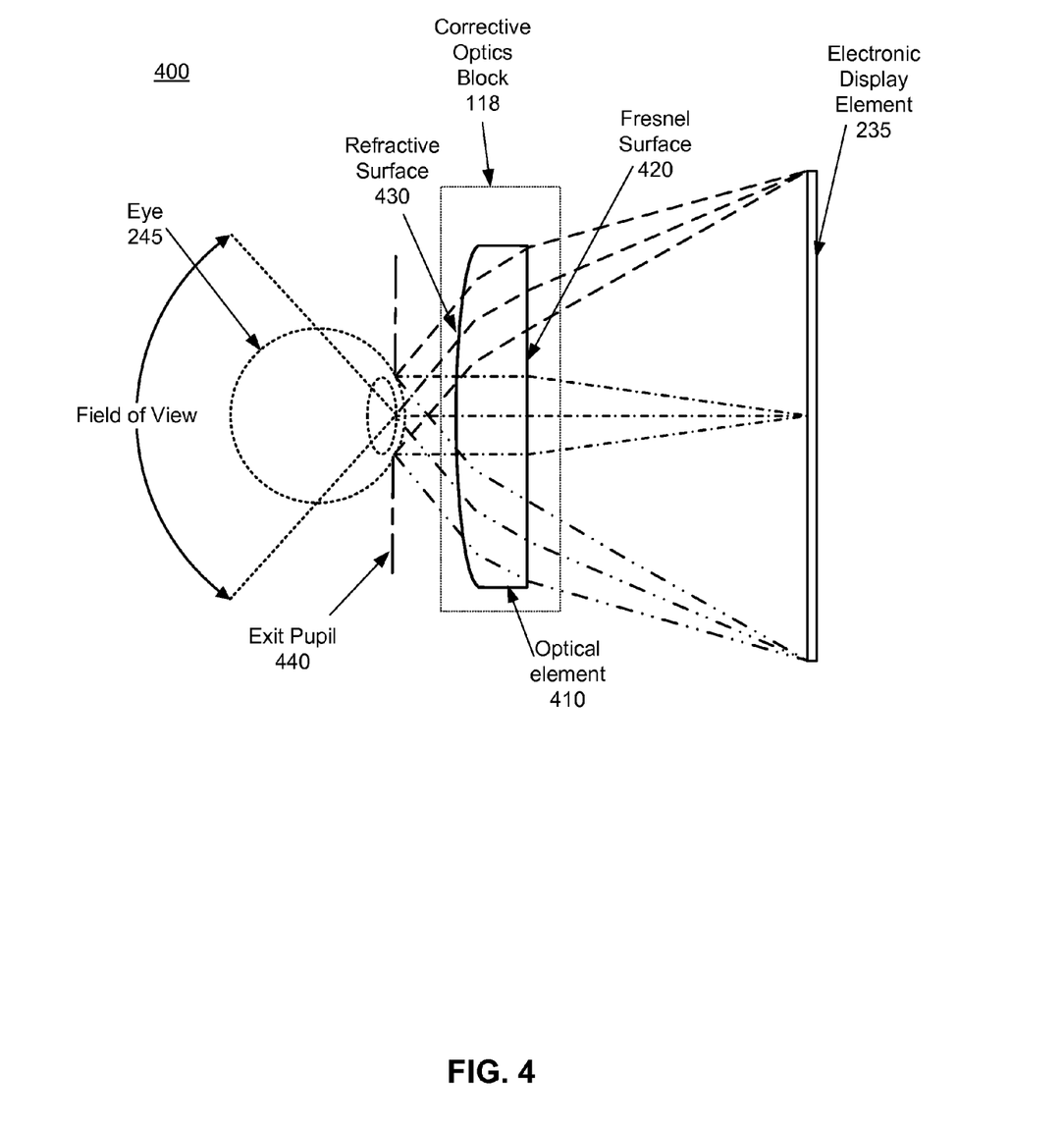
FIG. 4 is an optical block including a corrective optics block that is a single optical element having a Fresnel surface, in accordance with an embodiment.

FIG. 4 is an embodiment of an optical block 400 where the corrective optics block 118 is a single optical element 410 having a Fresnel surface 420. In the example of FIG. 4, the optical block 400 includes the electronic display element 235 and the optical element 410, which is shaped and positioned to magnify images presented by the electronic display 235 and to correct for fixed pattern noise. Additionally, the optical element 410 may also be configured and positioned to correct for other optical errors (e.g., chromatic aberration). The optical element 410 includes the Fresnel surface 420 and a refractive surface 430. The Fresnel surface 420 allows for correction of fixed pattern noise without affecting field curvature. The Fresnel surface 420 includes a series of equally spaced grooves, with the distance between the grooves referred to as "pitch width." The pitch width determines the amount the sub-pixels are blurred. The Fresnel surface 420 diffracts the image light from the electronic display element 235, and the diffraction of the image light generates the blur spots discussed above in conjunction with FIG. 3B. In some embodiments, the pitch width has a higher density of grooves near a center of the optical element generally corresponding to the area on the user's retina containing the highest density of cones. The refractive surface 430 is convex shaped and provides the diffracted image light to an exit pupil 440.

System parameters may be varied through an optical computer aided design (CAD) program or other suitable method to determine configurations of the optical block 400. For example, the optical block 400 has an eye relief of 10 mm, the Fresnel surface 420 has a groove pitch width of 200 µm, and the field of view is up to 110 degrees. In other embodiments, one or more system parameters may be varied; for example, parameters are altered to accommodate a longer eye relief (e.g., 15 mm).

Figure 5:
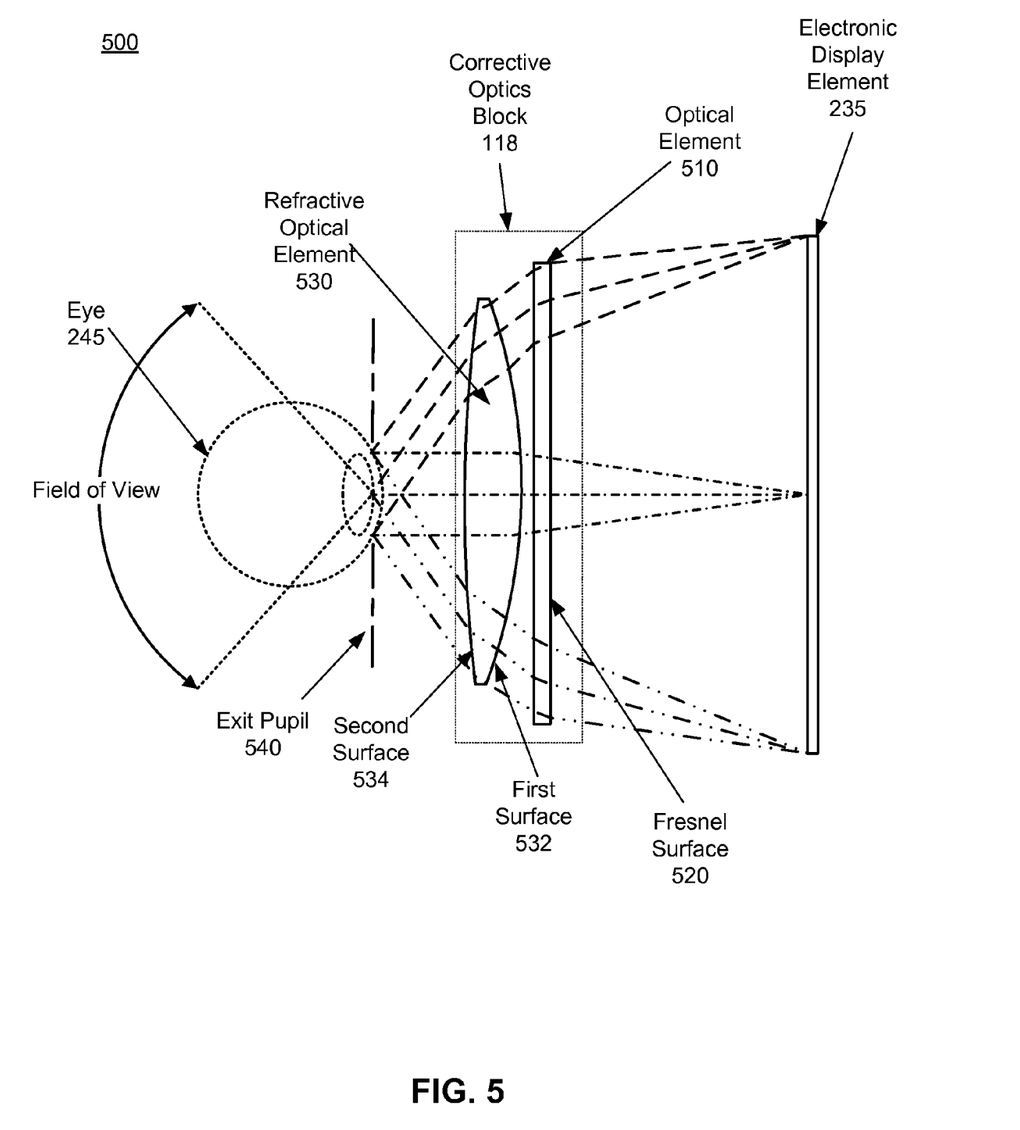
FIG. 5 is an optical block including corrective optics block comprising an optical element with a Fresnel surface and a separate refractive optical element, in accordance with an embodiment.

FIG. 5 is an example optical block 500 where the corrective optics block 118 includes an optical element 510 having a Fresnel surface 520 and a separate refractive optical element 530. The optical element 510 and the separate refractive optical element 530 are shaped and positioned to magnify the electronic display 235 and correct for fixed pattern noise, as well as correct for one or more additional optical errors. Because the optical block 500 shown in FIG. 5 has discrete refractive and diffractive elements, the optical block 500 is simpler to manufacture than the optical block 400 shown in FIG. 4, which combines the diffractive and refractive properties into a single optical element 410, which may result in difficulties in manufacturing and potential problems with glare. The Fresnel surface 520 of the optical element 510 is positioned to receive image light from the electronic display element 235 and generate blur spots, further described above in conjunction with FIG. 3B, by diffracting image light from the electronic display element 235.

The refractive optical element 530 is a convex lens that provides the diffracted image light to an exit pupil 540. As shown in FIG. 5, the refractive optical element 530 includes a first surface 532 that receives diffracted light from the optical element 510 and a second surface 534 that directs the diffracted light toward an exit pupil 540. The first surface 532 and the second surface 534 have different curvatures, with the curvatures of the surfaces 532, 534 selected to direct the diffracted light to the exit pupil 540, to minimize introduction of optical error, to correct one or more optical errors, or to perform any suitable function.

System parameters may be varied through an optical computer aided design (CAD) program or other suitable method to determine configurations of the optical block 400. For example, the optical block 400 has an eye relief of 10 mm, the Fresnel surface 420 has a groove pitch width of 200 µm, and the field of view is up to 110 degrees. In other embodiments, one or more system parameters may be varied; for example, parameters are altered to accommodate a longer eye relief (e.g., 15 mm).

Figure 6A:
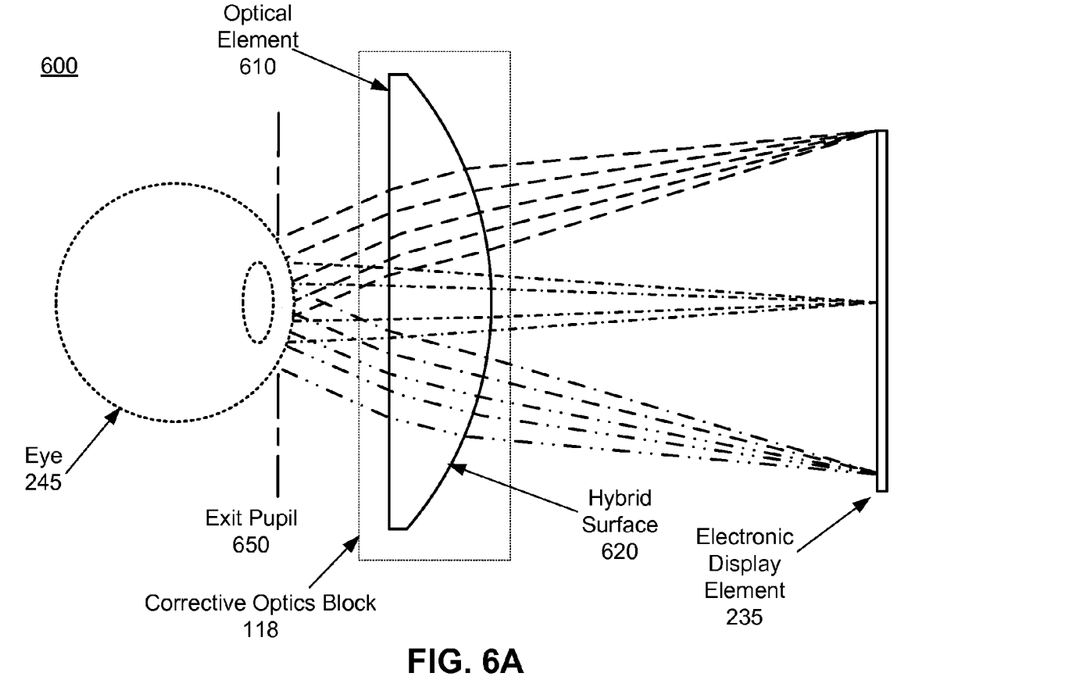
FIG. 6A is an optical block including a corrective optics block that is a single optical element having a hybrid surface, in accordance with an embodiment.

FIG. 6A is an example of an optical block 600 where the corrective optics block 118 is a single optical element 610 having a hybrid surface 620. The optical block 600 includes the electronic display element 235 and the optical element 610, which is shaped and positioned to magnify image light from the electronic display 235, correct for fixed pattern noise, and correct for one or more other optical errors. Image light from the electronic display 235 is altered by the optical element 610, which provide the altered image light to an exit pupil 650 for presentation to a user.

Figure 6B:
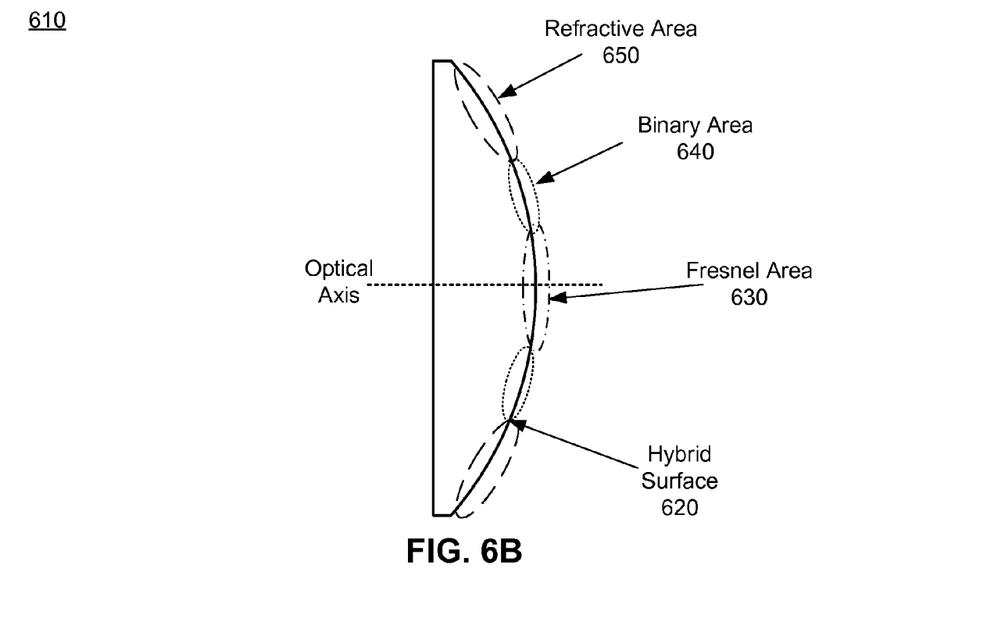
FIG. 6B is an alternative example of an optical block including a corrective optics block having a hybrid surface, in accordance with an embodiment.

FIG. 6B shows one embodiment of the single optical element 610 of FIG. 6A. The hybrid surface 620 of the optical element 610 includes both diffractive (e.g., Fresnel and Binary) and refractive areas. In the example of FIG. 6B, the hybrid surface 620 includes a Fresnel area 630, a binary area 640, and a refractive area 650. The respective sizes of the Fresnel area 630, the binary area 640, and the refractive area 650 are determined based on the magnification and focus quality across the field of view.

The Fresnel area 630 is located in a center portion of the hybrid surface 620 along an optical axis of the optical element 610 and includes a plurality of grooves having an equal pitch width. In some embodiments, the radius of the Fresnel area 630 measured from the optical axis is one half the height of an aperture (e.g., pupil diameter). The Fresnel area 630 prevents excessive ghosting (i.e., multiple images of objects being visible) in the altered image light provided to the exit pupil 650.

The binary area 640 is located between the Fresnel area 630 and the refractive area 650 and includes a plurality of grooves separated by one or more different pitch widths. The binary area 640 has a similar shape to the Fresnel area 630, but has a different pitch width. Pitch widths separating grooves in the binary area 640 are determined to generate blur spots masking dark space between sub-pixels. In various embodiments, pitch width values are determined based on a desired focus quality and magnification across the field of view. In some embodiments, the pitch width is calculated based on the amount of blur needed to cover the dark space between adjacent green sub-pixels 330 (which is the sub-pixel having the smallest physical dimensions in some embodiments).

The refractive area 650 operates as a conventional convex lens. In the example shown by FIG. 6B, the optical element 610 has rotational symmetry around the optical axis. Additionally, system parameters may be varied, as described above in conjunction with FIGS. 4 and 5.

Summary

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A virtual reality headset comprising:
an electronic display element configured to output image light via a plurality of sub-pixels having different colors, sub-pixels separated from each other by a dark space; and
a corrective optics block including an optical element that includes a convex surface and a Fresnel surface, the Fresnel surface positioned to receive the image light from the electronic display element and to generate the optically corrected image light, the corrective optics block configured to:
magnify the image light received from the electronic display element,
generate optically corrected image light by generating blur spots to mask the dark space between adjacent sub-pixels using the Fresnel surface, each blur spot corresponding to a blurred image of a sub-pixel in the image light, and
direct, using the convex surface, the optically corrected image light to an exit pupil of the VR headset corresponding to a location of an eye of a user of the VR headset, and a center of the exit pupil is at least 10 mm from the convex surface.

2. The virtual reality headset of claim 1, wherein a field of view of the optically corrected image light via the exit pupil available to the user is at least 110 degrees.

3. The virtual reality headset of claim 1, wherein the corrective optics block is further configured to remove one or more optical errors selected from a group consisting of: spherical aberration, comatic aberration, astigmatism, field curvature, and any combination thereof.

4. The virtual reality headset of claim 1, wherein the corrective optics block is separated from the electronic display element by at least 35 mm.

5. A virtual reality headset comprising:
an electronic display element configured to output image light via a plurality of sub-pixels having different colors, sub-pixels separated from each other by a dark space;
an optical element that includes including:
a Fresnel area located in a center portion of the optical element and including a plurality of grooves that have equal pitch width,
a refractive area along an outer portion of the optical element, and
a binary area located between the Fresnel area and the refractive area, the binary area including a plurality of binary grooves separated by one or more different pitch widths determined to generate optically corrected image light including blur spots that mask the dark space between adjacent sub-pixels, each blur spot corresponding to a blurred image of a corresponding sub-pixel in the image light; and
an exit pupil configured to receive the optically corrected image light from the optical element for presentation to a user.

6. The virtual reality headset of claim 5, wherein a center of the exit pupil is at least 10 mm from a surface of the optical element nearest to the exit pupil.

7. The virtual reality headset of claim 5, wherein a field of view available to the user of the optically corrected image light via the exit pupil is at least 110 degrees.

8. The virtual reality headset of claim 5, wherein the optical element is configured to remove one or more optical errors selected from a group consisting of: spherical aberration, comatic aberration, astigmatism, field curvature, and any combination thereof.

9. The virtual reality headset of claim 5, wherein the optical element is separated from the electronic display element by at least 35 mm.

10. A virtual reality headset comprising:
an electronic display element configured to output image light via a plurality of sub-pixels having different colors, sub-pixels separated from each other by a dark space; and
a corrective optics block including an optical element where at least a portion of the optical element is a Fresnel surface, the corrective optics block configured to:
magnify the image light received from the electronic display element,
generate optically corrected image light by generating blur spots to mask the dark space between adjacent sub-pixels using the Fresnel surface, each blur spot corresponding to a blurred image of a sub-pixel in the image light using the Fresnel surface, and
direct the optically corrected image light to an exit pupil of the VR headset corresponding to a location of an eye of a user of the VR headset.

11. The virtual reality headset of claim 10, wherein the Fresnel surface is positioned to receive the image light from the electronic display element and configured to generate the optically corrected image light, and the optical element includes a convex refractive surface configured to receive the optically corrected image light from the Fresnel surface and to direct the optically corrected image light to the exit pupil.

12. The virtual reality headset of claim 10, wherein the Fresnel surface is positioned to receive the image light from the electronic display element and configured to generate the optically corrected image light, and the corrective optics block further includes a convex refractive element positioned between the optical element and the exit pupil to direct the optically corrected image light to the exit pupil.

13. The virtual reality headset of claim 10, wherein a center of the exit pupil is at least 10 mm from an optical surface of the optics block nearest to the exit pupil.

14. The virtual reality headset of claim 10, wherein a field of view available to the user of the optically corrected image light via the exit pupil is at least 110 degrees.

15. The virtual reality headset of claim 10, wherein the corrective optics block is configured to remove one or more optical errors selected from a group consisting of: spherical aberration, comatic aberration, astigmatism, field curvature, and any combination thereof.

16. The virtual reality headset of claim 10, wherein the corrective optics block is separated from the electronic display element by at least 35 mm.

* * * * *

UNITED STATES PATENT AND TRADEMARK OFFICE
CERTIFICATE OF CORRECTION

PATENT NO.          : 9,599,822 B2                     Page 1 of 1
APPLICATION NO.     : 14/479597
DATED               : March 21, 2017
INVENTOR(S)         : Youngshik Yoon et al.

It is certified that error appears in the above-identified patent and that said Letters Patent is hereby corrected as shown below:

In the Claims

Column 11, Line 42, Claim 1, after "generate" delete "the".

Column 11, Line 47, Claim 1, after "generate" insert -- the --.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*